(12) United States Patent
Vedantham et al.

(10) Patent No.: US 10,091,101 B2
(45) Date of Patent: Oct. 2, 2018

(54) DYNAMIC MEDIUM SWITCHING FOR HYBRID NETWORKS

(71) Applicant: TEXAS INSTRUMENTS INCORPORATED, Dallas, TX (US)

(72) Inventors: Ramanuja Vedantham, Allen, TX (US); Jiun-Ren Lin, Pittsburgh, PA (US); Xiaolin Lu, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 424 days.

(21) Appl. No.: 14/519,990

(22) Filed: Oct. 21, 2014

(65) Prior Publication Data
US 2015/0110130 A1 Apr. 23, 2015

Related U.S. Application Data

(60) Provisional application No. 61/893,432, filed on Oct. 21, 2013.

(51) Int. Cl.
*H04J 3/16* (2006.01)
*H04L 12/721* (2013.01)
*H04W 40/12* (2009.01)

(52) U.S. Cl.
CPC ............ *H04L 45/70* (2013.01); *H04L 45/124* (2013.01); *H04W 40/12* (2013.01); *Y02D 70/00* (2018.01);
(Continued)

(58) Field of Classification Search
CPC ..................... H04B 2203/5441; H04B 17/309; H04B 1/74; H04B 3/54; H04B 1/38; H04B 1/3833; H04B 1/406; H04L 12/5692; H04L 29/06; H04L 1/0002; H04L 1/0026; H04L 2012/2841; H04L 43/08; H04L 45/24; H04W 88/06; H04W 36/245; H04W 40/10; H04W 40/12; H04W 40/20; H04W 84/18; H04W 40/00; H04W 40/24; H04M 2207/206
(Continued)

(56) References Cited

U.S. PATENT DOCUMENTS

| | | | |
|---|---|---|---|
| 9,001,787 B1 * | 4/2015 | Conant | H04W 36/04 370/328 |
| 2002/0080774 A1 * | 6/2002 | Griffith | H04W 28/06 370/352 |

(Continued)

*Primary Examiner* — Noel R Beharry
*Assistant Examiner* — Lionel Preval
(74) *Attorney, Agent, or Firm* — Kenneth Liu; Charles A. Brill; Frank D. Cimino

(57) ABSTRACT

A method and apparatus for dynamic medium switching in a hybrid network. A method for packet transmission by a combo device includes maintaining a wireless network confidence rating value that is indicative of packet transfer reliability of a wireless network accessed by the device. A wired network confidence rating value that is indicative of packet transfer reliability of a wired network accessed by the device is also maintained. One of the wireless network and the wired network to be used for initial transmission of the data packet is selected based on which of the wireless confidence rating value and the wired confidence rating value is indicative of a higher likelihood of the packet being successfully transmitted. The packet is routed to be transmitted via the selected network.

27 Claims, 5 Drawing Sheets

(52) U.S. Cl.
CPC .......... *Y02D 70/142* (2018.01); *Y02D 70/144* (2018.01); *Y02D 70/34* (2018.01)

(58) Field of Classification Search
USPC ..... 370/437, 328, 352, 338, 252; 455/452.1; 709/228
See application file for complete search history.

(56) References Cited

U.S. PATENT DOCUMENTS

| | | | |
|---|---|---|---|
| 2006/0075124 A1* | 4/2006 | Dougherty | H04L 12/5692 709/228 |
| 2009/0201899 A1* | 8/2009 | Liu | H04L 45/24 370/338 |
| 2010/0202358 A1* | 8/2010 | Wu | H04L 12/5692 370/328 |
| 2014/0036702 A1* | 2/2014 | Van Wyk | H04B 3/46 370/252 |
| 2015/0038156 A1* | 2/2015 | Kilpatrick, II | H04W 64/00 455/452.1 |

* cited by examiner

DYNAMIC MEDIUM SWITCHING FOR HYBRID NETWORKS

CROSS-REFERENCE TO RELATED APPLICATION

The present application claims priority to U.S. Provisional Patent Application No. 61/893,432, filed on Oct. 21, 2013, entitled "Dynamic Medium Switching Algorithm for Hybrid Smart Grid Networks," which is hereby incorporated herein by reference in its entirety.

BACKGROUND

The "smart grid" generally refers to electricity delivery systems that use computer-based remote control to manage power delivery. The systems include two-way communication technology and processing that facilitate energy delivery and use measurement. Each device connected to the smart grid may include sensors to collect energy use and network status information, and network transceiver electronics to provide communication between devices.

SUMMARY

A method and apparatus for dynamic medium switching in a hybrid network are disclosed herein. In one embodiment, a wireless device includes a wireless transceiver, a wired transceiver, and medium switching logic. The wireless transceiver is configured for transfer of data packets via a wireless network. The wired transceiver is configured for transfer of data packets via a wired network. The medium switching logic determines which of the wireless transceiver and the wired transceiver is to be used to transmit a data packet. The medium switching logic is configured to maintain a wireless network confidence rating value that is indicative of packet transfer reliability of the wireless network, and to maintain a wired network confidence rating value that is indicative of packet transfer reliability of the wired network. The medium switching logic is also configured to select one of the wireless transceiver and the wired transceiver to be used for initial transmission of the data packet based on which of the wireless confidence rating value and the wired confidence rating value is indicative of a higher likelihood of the packet being successfully transmitted, and to route the packet to the selected transceiver for transmission.

In another embodiment, a method for packet transmission by a combo device includes maintaining a wireless network confidence rating value that is indicative of packet transfer reliability of a wireless network accessed by the device. A wired network confidence rating value that is indicative of packet transfer reliability of a wired network accessed by the device is also maintained. One of the wireless network and the wired network to be used for initial transmission of the data packet is selected based on which of the wireless confidence rating value and the wired confidence rating value is indicative of a higher likelihood of the packet being successfully transmitted. The packet is routed to a transceiver of the combo node for transmission via the selected network.

In a further embodiment, a smart grid network includes a plurality of nodes communicatively coupled via a wired network or a wireless network. At least one of the nodes includes medium switching logic that determines which of the wireless network and the wired network is to be used to transmit a data packet. The medium switching logic is configured to maintain a wireless network confidence rating value that is indicative of packet transfer reliability of the wireless network, and to maintain a wired network confidence rating value that is indicative of packet transfer reliability of the wired network. The medium switching logic is also configured to select one of the wireless network and the wired network to be used for initial transmission of the data packet based on which of the wireless confidence rating value and the wired confidence rating value is indicative of a higher likelihood of the packet being successfully transmitted. The medium switching logic is further configured to select a retransmission allowance that defines a number of allowable transmission attempts for the initial transmission. The retransmission allowance is determined based on a difference of the wired network confidence rating and the wireless network confidence rating. The medium switching logic is also configured to provide the data packet and retransmission allowance to transmission logic for packet transmission via the selected network.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. The recitation "based on" is intended to mean "based at least in part on." Therefore, if X is based on Y, X may be based on Y and any number of additional factors.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

In a conventional smart grid network, devices communicate using either Radio Frequency (RF) or Power Line Communication (PLC). In order to provide better system reliability, better coverage, and larger network throughput, some smart grid networks may include combo nodes that support both RF and PLC links. The combo nodes can dynamically select the optimal link over which to forward a data packet. The method for determining the optimal link over which to transmit a packet is referred to herein as a Dynamic Medium Switching Algorithm (DMSA).

Embodiments of the present disclosure include DMSA logic that provides improved system performance in hybrid smart grid networks. Devices implementing the DMSA dynamically determine, based on channel condition and other variables, what medium to employ to transfer a data packet.

Figure 1:
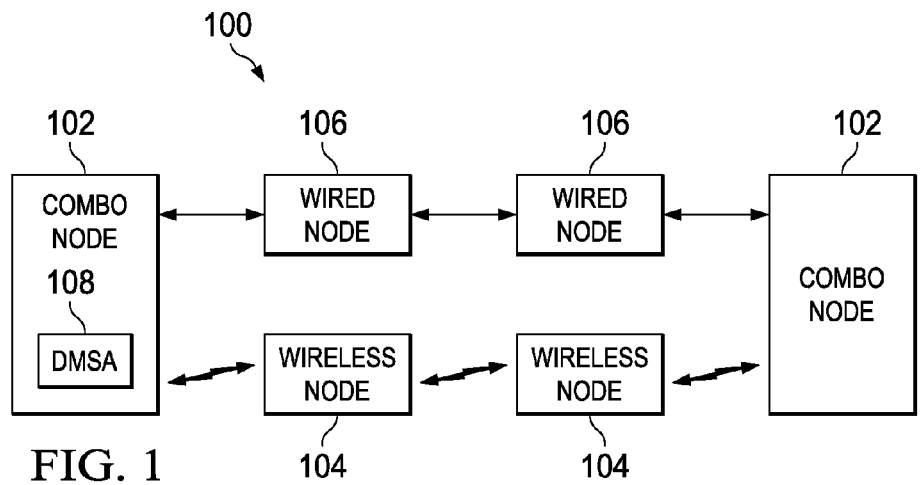
FIG. 1 shows a block diagram of a hybrid network in accordance with various embodiments.

FIG. 1 shows a block diagram of a hybrid network 100 in accordance with various embodiments. The network 100 includes wired nodes 106, wireless nodes 104 and combo nodes 102. The nodes 102, 104, and 106 are communication devices. The wired nodes 106 communicate via an electrically conductive medium, such as wiring. The wireless nodes 104 communicate wirelessly via radio frequency electromagnetic signals. The combo nodes 102 can selectively communicate via the conductive medium or the wireless medium. In some embodiments of the network 100, the wired nodes 106 and combo nodes 102 may form a wired network that communicates via the conductors of an electrical power distribution system using protocols specified by a standard such as IEEE 1901.2, the G3-PLC standard, or other power line communication standard. The wireless nodes 104 and the combo nodes 102 may form a wireless network that communicates using protocols specified by a standard such as IEEE 802.15.4, IEEE 802.11, or other wireless communication standard.

The combo nodes 102 include DMSA system 108. The DMSA system 108 maintains confidence rating values for packet transfers via the wired and wireless networks, and selects, for each packet to be transmitted by the combo node 102, the network most likely to provide successful transfer of the packet to a destination device. The confidence ratings are based on historical performance of the wired and wireless networks measured by each combo node 102. By selecting the network most likely to produce successful data transfer for each packet, the combo node 102 increases the probability of successful data transfer while reducing the number of retransmissions needed to provide successful transfer.

Figure 2:
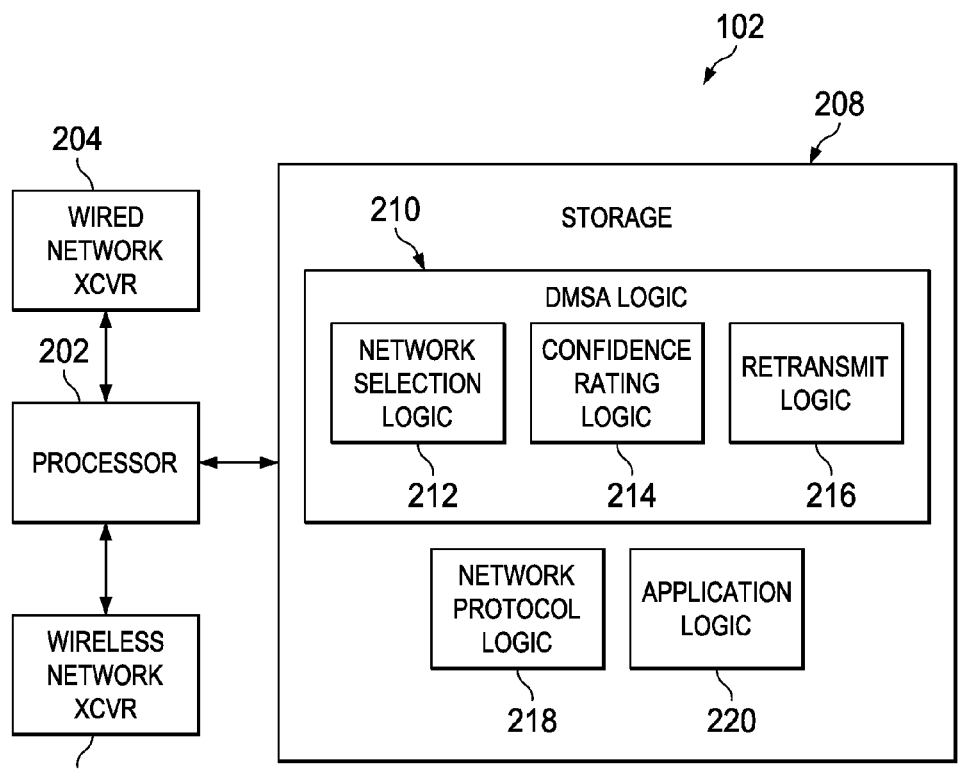
FIG. 2 shows a block diagram of a combo node in accordance with various embodiments.

FIG. 2 shows a block diagram of a combo node 102 in accordance with various embodiments. The combo node 102 includes a processor 202, a wired network transceiver 204, a wireless network transceiver 206, and storage 208. The combo node 102 may include various other components and subsystems that have been omitted from FIG. 2 in the interest of clarity. For example, the combo node 102 may include power systems that provide electrical power to the circuitry of the combo node 102, sensors that allow the combo node 102 to measure parameters of operation, and/or other components or sub-systems.

The wired network transceiver 204 couples the combo node 102 to the wired network, and provides modulation, encoding, signal drive, and other functionality needed to access and transfer data via the wired network. Similarly, the wireless network transceiver 206 couples the combo node 102 to the wireless network, and provides modulation, encoding, signal drive, and other functionality needed to access and transfer data via the wireless network.

The processor 202 is coupled to the wired transceiver 204 and the wireless transceiver 206, and may be a general-purpose microprocessor, a digital signal processor, a microcontroller, or other device capable of executing instructions retrieved from a computer-readable storage medium. Processor architectures generally include execution units (e.g., fixed point, floating point, integer, etc.), storage (e.g., registers, memory, etc.), instruction decoding, instruction and data fetching logic, peripherals (e.g., interrupt controllers, timers, direct memory access controllers, etc.), input/output systems (e.g., serial ports, parallel ports, etc.) and various other components and sub-systems.

The storage 208 is a non-transitory computer-readable storage medium suitable for storing instructions executable by the processor 202. The storage 208 may include volatile storage such as static and/or dynamic random access memory, or other volatile memory. The storage 208 may also include non-volatile storage, such FLASH storage, read-only-memory, or other non-volatile storage. The storage 208 includes application logic 202, network protocol logic 218, and DMSA logic 210. The DMSA system 108 shown in FIG. 1 comprises the processor 202 and the DMSA logic 210.

Application logic 220 includes instructions of various applications executed by the combo node 102. For example, an application may periodically read a sensor coupled to the processor 202 and transfer a measurement value to a destination device via the hybrid network 100. The network protocol logic 218 includes instructions that implement at least a portion of a protocol stack applied to packets transmitted or received on each of the wired and wireless networks. The wired network may apply a different protocol stack than the wireless network. For example, the wired network may implement a protocol in accordance with the IEEE 1901.2 standard, and the wireless network may implement a protocol in accordance with the IEEE 802.15.4 standard.

Figure 3:
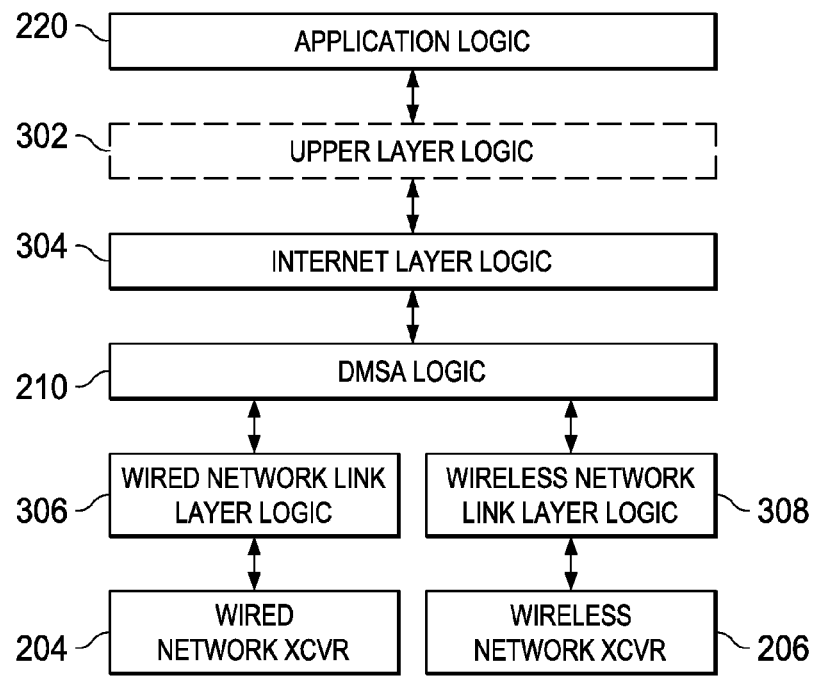
FIG. 3 shows arrangement of logic in a combo node in accordance with various embodiments.

The DMSA logic 210 includes instructions executed by the processor 202 to implement network selection for each packet transmitted by the combo node 102. FIG. 3 shows arrangement of logic in the combo node 102 in accordance with various embodiments. The protocol logic layers 302, 304, 306, and 308 may be provided by the network protocol logic 218. The DMSA logic 210 operates and transfers data between the internet layer logic 304 (e.g., IP layer logic) common to both wired and wireless networks and the link layer logic 306, 308 (e.g., medium access control logic) specific to each of the wired and wireless networks.

Figure 4:
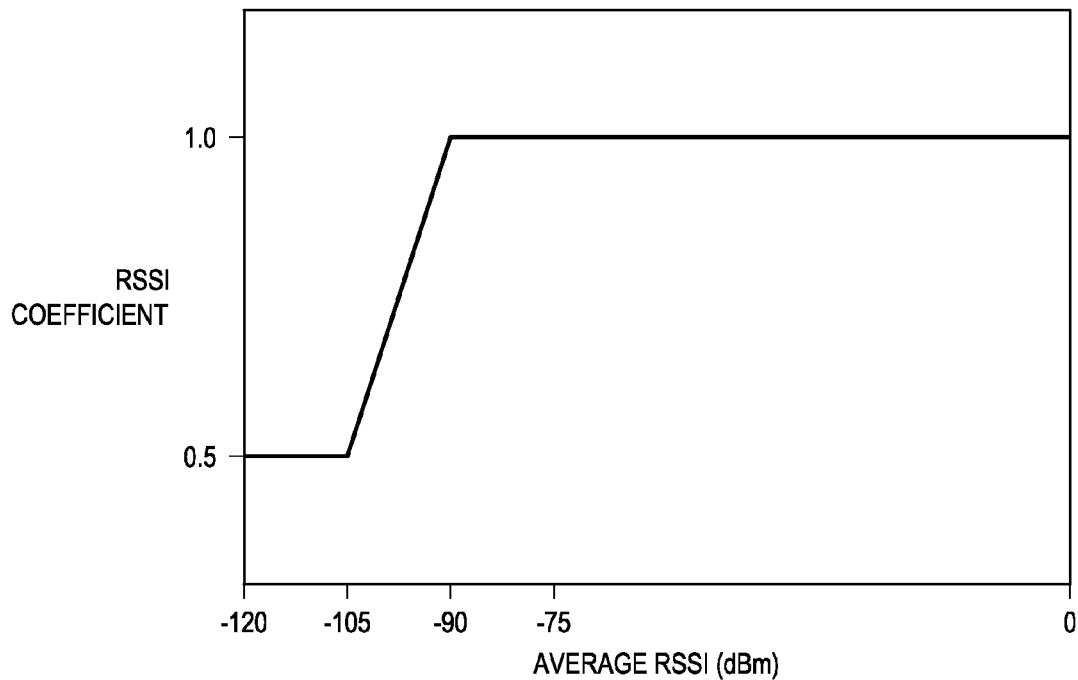
FIG. 4 shows a diagram illustrating assignment of received signal strength indicator coefficient values in accordance with various embodiments.
Figure 5:
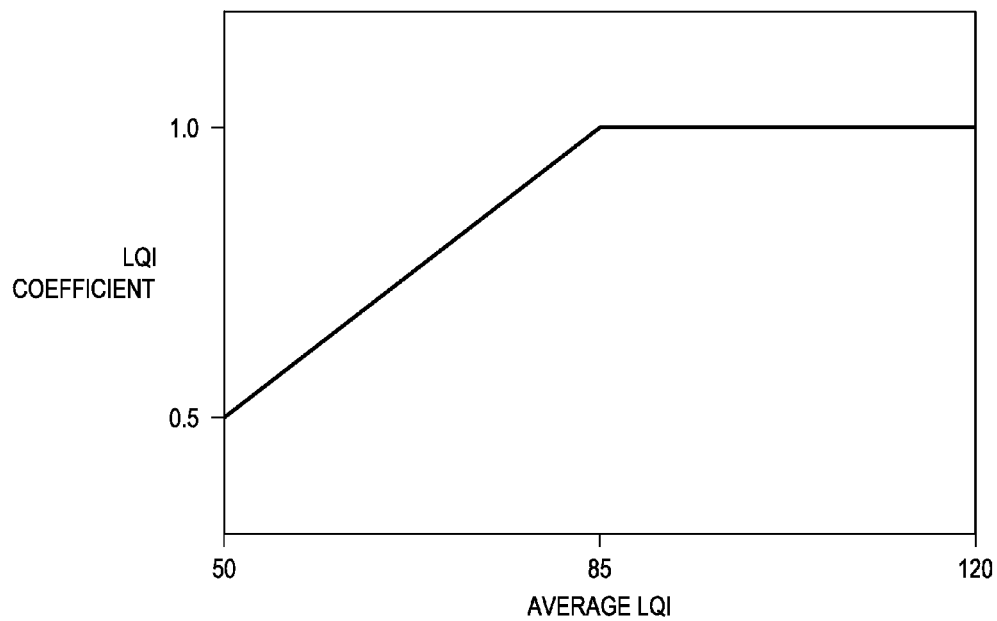
FIG. 5 shows a diagram illustrating assignment of link quality index coefficient values in accordance with various embodiments.

The DMSA logic 210 includes network selection logic 212, confidence rating logic 214 and retransmit logic 216. The confidence rating logic 214 computes and maintains a confidence rating value for the wired network and a confidence rating value for the wireless network. The confidence rating logic 214 may compute the confidence rating value for each network based on historical values of packet deliver ratio (PDR), received signal strength indicator (RSSI), and link quality indicator (LQI) for the network. In some embodiments, the confidence rating logic 214 may calculate a moving average of PDR, RSSI, and/or LQI based on previous data transmissions, and apply the average values to compute confidence rating. The confidence rating logic 214 may update the confidence rating value for a network based on results of each packet transmission via the network. Some embodiments of the confidence rating logic 214 may compute confidence rating as:

$$CR=xyP$$

where:
P is average historical PDR,
x is the RSSI coefficient, and
y is the LQI coefficient.
The confidence rating logic 214 may determine the RSSI coefficient and the LQI coefficient using the two functions respectively shown in FIG. 4 and FIG. 5.

For each packet transferred to the DMSA logic 210 from the internet layer logic 304, the DMSA logic 210 determines, based on the network confidence rating values, which of the wired and wireless networks is to be initially applied to transmit the packet. The network selected for initial transmission may be the network having the higher confidence rating. If confidence ratings of the two networks are equal, the network selection logic 212 may randomly select one of the networks, or apply an additional criterion to select the initial network.

Some embodiments of the network selection logic 212 may apply other metrics to select between the wired network and the wireless network. In some embodiments, load balancing may be implemented by selecting a destination node and/or network that attempts to ensure that the overall traffic served through any of the nodes serving as an intermediate router is similar. In some embodiments, the working life of battery powered nodes (e.g., wireless nodes 104) may be improved by route selection that minimizes the use of battery powered nodes as intermediate routing nodes, by selecting as many wired nodes 106 and combo nodes 102 as possible, where the wired nodes 106 and combo nodes 102 are powered via the power mains.

Figure 6A:
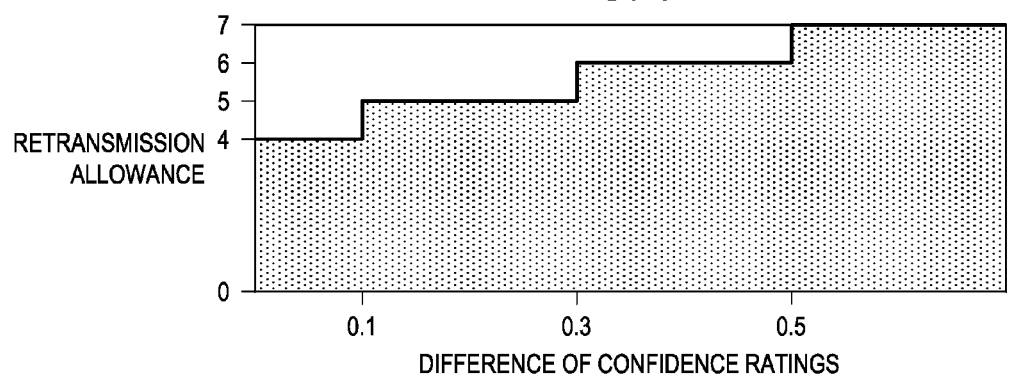
FIGS. 6A and 6B show a diagram illustrating assignment of retransmission allowance values based on difference in confidence rating in accordance with various embodiments.
Figure 6B:
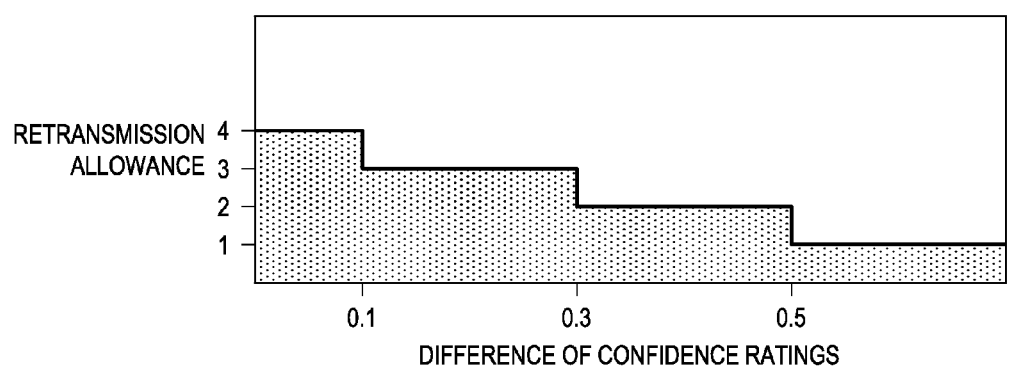

The retransmit logic 216 determines a retransmission allowance for each network. The retransmission allowance specifies the number of retransmission attempts allowed on the associated network. The retransmission allowance for a network may be determined based on the confidence rating of the network. FIGS. 6A and 6B show retransmission allowances for the wired and wireless networks respectively, where the retransmission allowance assigned to each network is based on a difference in confidence ratings computed for the networks. For example, if the network corresponding to FIG. 6A has a confidence rating value of 0.6, and the network corresponding to FIG. 6B has a confidence rating value of 0.2, then the difference of the two confidence rating values is 0.4. Accordingly, the retransmission allowance assigned to the network of corresponding to FIG. 6A is 6, and the retransmission allowance assigned to the network of corresponding to FIG. 6B is 2.

Considering the confidence rating values of 0.6 and 0.2 of the above example, the network selection logic 212 may select the network having the higher confidence rating value (0.6) as the initial network to apply for transmission of the packet. The DMSA logic 210 passes the packet and the retransmission allowance value assigned to the network to the link layer logic (e.g., wired network link layer logic 306).

The link layer logic 306 attempts to successfully transmit the packet within the specified number of retransmission attempts.

If transmission of the packet via the initially selected network is unsuccessful, within the specified number of retransmission attempts, then control of packet transmission returns to the DMSA logic 210, and the network selection logic 212 selects the network not initially applied (e.g., the wireless network) for additional transmission attempts. The DMSA logic 210 passes the packet and the retransmission allowance value assigned to the secondary network to the link layer logic (e.g., wireless network link layer logic 308), and transmission of the packet is attempted via the secondary network. If transmission via the secondary network, within the retransmission allowance, is not successful, the control of packet transmission returns to the DMSA logic 210, and the network selection logic 212 may again attempt transmission via the initially selected network. In this manner, the DMSA logic 210 may alternate transmission attempts between the two different networks until transmission is successful or a predetermined maximum number of transmissions has been unsuccessfully attempted. The DMSA logic 210 may drop the packet if transmission is not successful within the maximum number of transmission attempts. With each attempted transmission of a packet, DMSA logic 210 receives network reliability information from the link layer logic, and the confidence rating logic 214 updates the confidence rating for the network on which packet transmission is attempted.

Figure 7:
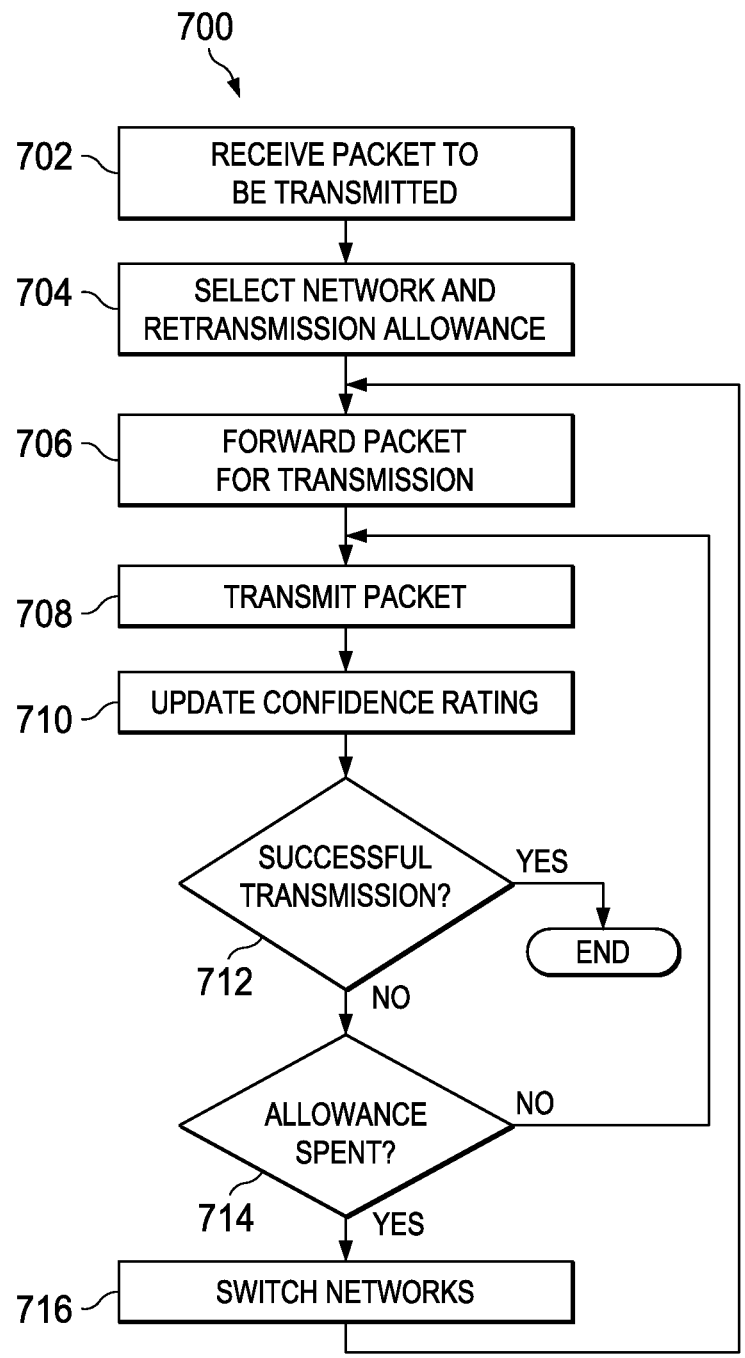
FIG. 7 shows a flow diagram for a method for medium switching in accordance with various embodiments.

FIG. 7 shows a flow diagram 700 for a method for medium switching in a combo node 102 in accordance with various embodiments. Though depicted sequentially as a matter of convenience, at least some of the actions shown can be performed in a different order and/or performed in parallel. Additionally, some embodiments may perform only some of the actions shown. At least some of the operations of the method 700 may be performed by the processor 202 executing instructions retrieved from a non-transitory computer readable storage medium 208.

In block 702, the DMSA logic 210 of combo node 102 receives, from the internet layer logic 304, a packet to be transmitted. In some embodiments, the DMSA logic 210 may receive a packet to be transmitted from higher layer logic other than the internet layer logic 304.

In block 704, the DMSA logic 210 selects a network to apply for initial transmission attempts and assigns a retransmission allowance for use by the selected network. The selection of the network and retransmission allowance may be based on the confidence rating values of each network available to the combo node 102. For example, the network with the higher confidence rating may be selected as the network for initial transmission attempts and be assigned a higher retransmission allowance than the network not selected.

In block 706, the DMSA logic 210 forwards the packet to be transmitted and the assigned retransmission allowance to link layer logic associated with the selected network. The link layer logic forwards the packet to the transceiver of the combo node 102 associated with the selected network, and the packet is transmitted in block 708.

With each transmission attempt, in block 710, the DMSA logic 210 receives network reliability information from the link layer logic, and the DMSA logic 210 updates the confidence rating value for the network.

In block 712, if packet transmission is unsuccessful, and the retransmission allowance has not been spent, in block 714, then the link layer logic retransmits the packet.

In block 712, if packet transmission is unsuccessful, and the retransmission allowance has been spent, in block 714, then control of transmission returns to the DMSA logic 210. In block 716, the DMSA logic 210 switches networks by selecting the network not applied in the last transmission attempt, and forwards the packet and the retransmission allowance for the network to the link layer logic for the network. Switching of networks and attempted transmission may continue in this manner until a maximum number of transmission attempts have been unsuccessfully attempted. Thereafter, the DMSA logic 210 may drop the packet.

Figure 8:
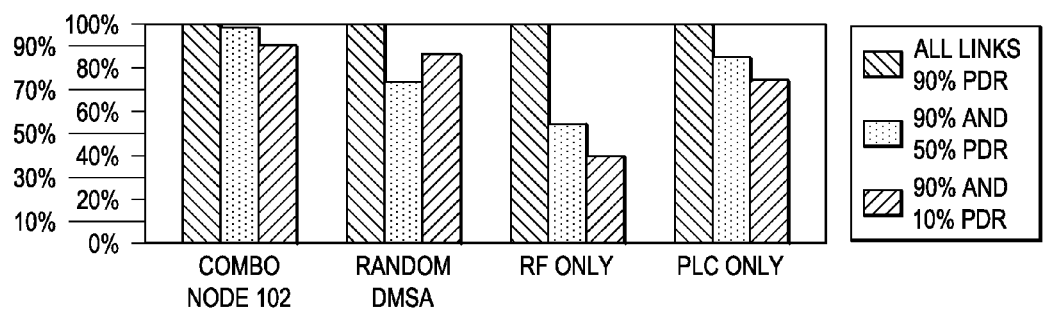
FIG. 8 shows average packet delivery ratios for various Dynamic Medium Switching Algorithm (DMSA) methods.

FIG. 8 shows average packet delivery ratios for various DMSA methods. FIG. 8 shows that using DMSA logic 210 the combo node 102 provides more reliable packet delivery than with other illustrated methods.

Figure 9:
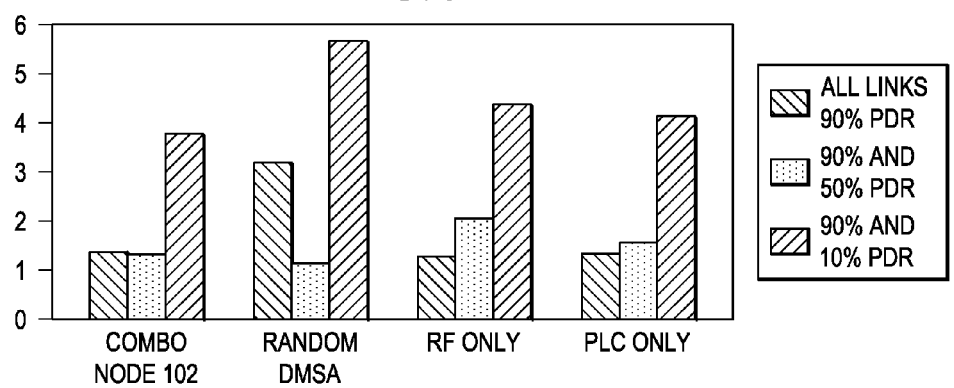
FIG. 9 shows average number of retransmissions required for successful data transfer for various DMSA methods.

FIG. 9 shows average number of retransmissions required for successful data transfer using various DMSA methods. FIG. 9 shows that using DMSA logic 210 the combo node 102 can provide successful packet transfer with fewer retransmissions than other methods.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A wireless device, comprising:
a wireless transceiver configured for transfer of data packets via a wireless network;
a wired transceiver configured for transfer of data packets via a wired network;
medium switching logic that determines which of the wireless transceiver and the wired transceiver is to be used to transmit a data packet, the medium switching logic is configured to:
maintain a wireless network confidence rating value that is indicative of packet transfer reliability of the wireless network;
maintain a wired network confidence rating value that is indicative of packet transfer reliability of the wired network;
select one of the wireless transceiver and the wired transceiver to be used for initial transmission of the data packet based on which of the wireless confidence rating value and the wired confidence rating value is indicative of a higher likelihood of the packet being successfully transmitted; and
route the packet to the selected transceiver for transmission.

2. The wireless device of claim 1, wherein the medium switching logic is configured to:
compute the wired network confidence rating based on historical packet delivery ratio for packets transferred via the wired network, received signal strength indicator for the wired network, and link quality indicator for the wired network; and
compute the wireless network confidence rating based on historical packet delivery ratio for packets transferred via the wireless network, received signal strength indicator for the wireless network, and link quality indicator for the wireless network.

3. The wireless device of claim 1, wherein the medium switching logic is configured to:

select a retransmission allowance that defines a number of allowable transmission attempts for the initial transmission; and
provide the retransmission allowance to the selected transceiver along with the data packet.

4. The wireless device of claim 3, wherein the medium switching logic is configured to determine the retransmission allowance based on a difference of the wired network confidence rating and the wireless network confidence rating.

5. The wireless device of claim 3, wherein the medium switching logic is configured to adjust the confidence rating value associated with the selected transceiver based on results of each transmission attempt using the selected transceiver.

6. The wireless device of claim 1, wherein the medium switching logic is configured to, in response to the initial transmission of the data packet being unsuccessful:
select one of the wireless transceiver and the wired transceiver not used for the initial transmission of the data packet to be used for an additional transmission attempt; and
route the packet to the transceiver selected for the additional transmission attempt in conjunction with the data packet.

7. The wireless device of claim 6, wherein the medium switching logic is configured to:
select a different retransmission allowance that defines a number of allowable transmission attempts for the additional transmission attempt; and
provide the different retransmission allowance to the transceiver selected for the additional transmission attempt in conjunction with the data packet.

8. The wireless device of claim 1, wherein the medium switching logic is configured to select a node to which the data packet is to be transmitted such that packet handling by nodes of the network is balanced.

9. The wireless device of claim 1, wherein the medium switching logic is configured to reduce battery use by routing the data packet via the wired transceiver.

10. A method for packet transmission by a hybrid device, comprising:
maintaining a wireless network confidence rating value that is indicative of packet transfer reliability of a wireless network accessed by the device;
maintaining a wired network confidence rating value that is indicative of packet transfer reliability of a wired network accessed by the device;
selecting one of the wireless network and the wired network to be used for initial transmission of the data packet based on which of the wireless confidence rating value and the wired confidence rating value is indicative of a higher likelihood of the packet being successfully transmitted; and
routing the packet to a transceiver for transmission via the selected network.

11. The method of claim 10, further comprising:
computing the wired network confidence rating based on historical packet delivery ratio for packets transferred via the wired network, received signal strength indicator for the wired network, and link quality indicator for the wired network; and
computing the wireless network confidence rating based on historical packet delivery ratio for packets transferred via the wireless network, received signal strength indicator for the wireless network, and link quality indicator for the wireless network.

12. The method of claim 10, further comprising:
selecting a retransmission allowance that defines a number of allowable transmission attempts for the initial transmission; and
providing the retransmission allowance to a transceiver for the selected network along with the data packet.

13. The method of claim 12, further comprising determining the retransmission allowance based on a difference of the wired network confidence rating and the wireless network confidence rating.

14. The method of claim 12, further comprising adjusting the confidence rating value associated with the selected network based on results of each transmission attempt using the selected network.

15. The method of claim 10, further comprising:
responsive to the initial transmission of the data packet being unsuccessful:
selecting one of the wireless network and the wired network not used for the initial transmission of the data packet to be used for an additional transmission attempt; and
routing the packet to be transmitted via the additional transmission.

16. The method of claim 15, further comprising:
selecting a different retransmission allowance that defines a number of allowable transmission attempts for the additional transmission attempt; and
providing, in conjunction with the data packet, the different retransmission allowance to a transceiver associated with the network selected for the additional transmission attempt.

17. A smart grid network, comprising:
a plurality of nodes communicatively coupled via a wired network or a wireless network, at least one of the nodes comprising:
medium switching logic that determines which of the wireless network and the wired network is to be used to transmit a data packet, the medium switching logic is configured to:
maintain a wireless network confidence rating value that is indicative of packet transfer reliability of the wireless network;
maintain a wired network confidence rating value that is indicative of packet transfer reliability of the wired network; and
select one of the wireless network and the wired network to be used for initial transmission of the data packet based on which of the wireless confidence rating value and the wired confidence rating value is indicative of a higher likelihood of the packet being successfully transmitted;
select a retransmission allowance that defines a number of allowable transmission attempts for the initial transmission, the retransmission allowance determined based on a difference of the wired network confidence rating and the wireless network confidence rating; and
provide the data packet and retransmission allowance to transmission logic for packet transmission via the selected network.

18. The smart grid network of claim 17, wherein the medium switching logic is configured to:
compute the wired network confidence rating based on historical packet delivery ratio for packets transferred via the wired network, received signal strength indicator for the wired network, and link quality indicator for the wired network; and
compute the wireless network confidence rating based on historical packet delivery ratio for packets transferred via the wireless network, received signal strength indicator for the wireless network, and link quality indicator for the wireless network.

19. The smart grid network of claim 17, wherein the medium switching logic is configured to adjust the confidence rating value associated with the selected network based on results of each transmission attempt using the selected network.

20. The smart grid network of claim 17, wherein the medium switching logic is configured to:
select one of the wireless network and the wired network not used for the initial transmission of the data packet to be used for an additional transmission attempt;
select a different retransmission allowance that defines a number of allowable transmission attempts for the additional transmission attempt;
provide the data packet and different retransmission allowance to transmission logic for packet transmission via the network selected for the additional transmission attempt.

21. A node in a hybrid network, comprising:
a wireless transceiver that couples the node with a wireless network;
a wired transceiver that couples the node with a wired network;
a processor coupled to the wireless transceiver and the wired transceiver;
a storage for storing instructions executable by the processor, the storage having a medium switching logic that determines which of the wireless network and the wired network is to be used to transmit a data packet;
the medium switching logic having:
a confidence rating logic that computes and maintains a wired network confidence rating value and a wireless network confidence rating value that are indicative of packet transfer reliability for the wired network and the wireless network respectively, wherein the medium switching logic selects one of the wireless network and the wired network to be used for initial transmission of the data packet based on one of the wired network confidence rating value and the wireless network confidence rating value.

22. The node of claim 21, wherein the medium switching logic includes a retransmission logic that selects a retransmission allowance that:
defines a number of allowable transmission attempts for the initial transmission, the retransmission allowance determined based on a difference of the wired network confidence rating value and the wireless network confidence rating value; and
provides the data packet and retransmission allowance for packet transmission via one of the wired network or the wireless network.

23. The node of claim 21, wherein the storage includes:
an application logic that includes instructions of applications executed by the node; and
a network protocol logic that includes instructions that implement at least a portion of a protocol stack applied to packets transmitted or received on the wired and wireless network.

24. The node of claim 23, wherein the wired network implements a protocol in accordance with the IEEE 1901.2 standard, and the wireless network implements a protocol in accordance with the IEEE 802.15.4 standard.

25. The node of claim 21, wherein the confidence rating logic computes the confidence rating value for each network based on historical values of packet deliver ratio (PDR), received signal strength indicator (RSSI), and link quality indicator (LQI) for the network.

26. The node of claim 21, wherein the confidence rating logic calculates a moving average of PDR, RSSI, and/or LQI based on previous data transmissions, and applies the average values to compute confidence rating.

27. The node of claim 21, wherein the confidence rating logic computes confidence rating as xyP, where P is average historical PDR, x is the RSSI coefficient, and y is the LQI coefficient.

* * * * *